Oct. 3, 1933.  A. E. HANSEN  1,929,112
ELEVATOR FOR TRUCKS
Filed Nov. 24, 1931   3 Sheets-Sheet 1
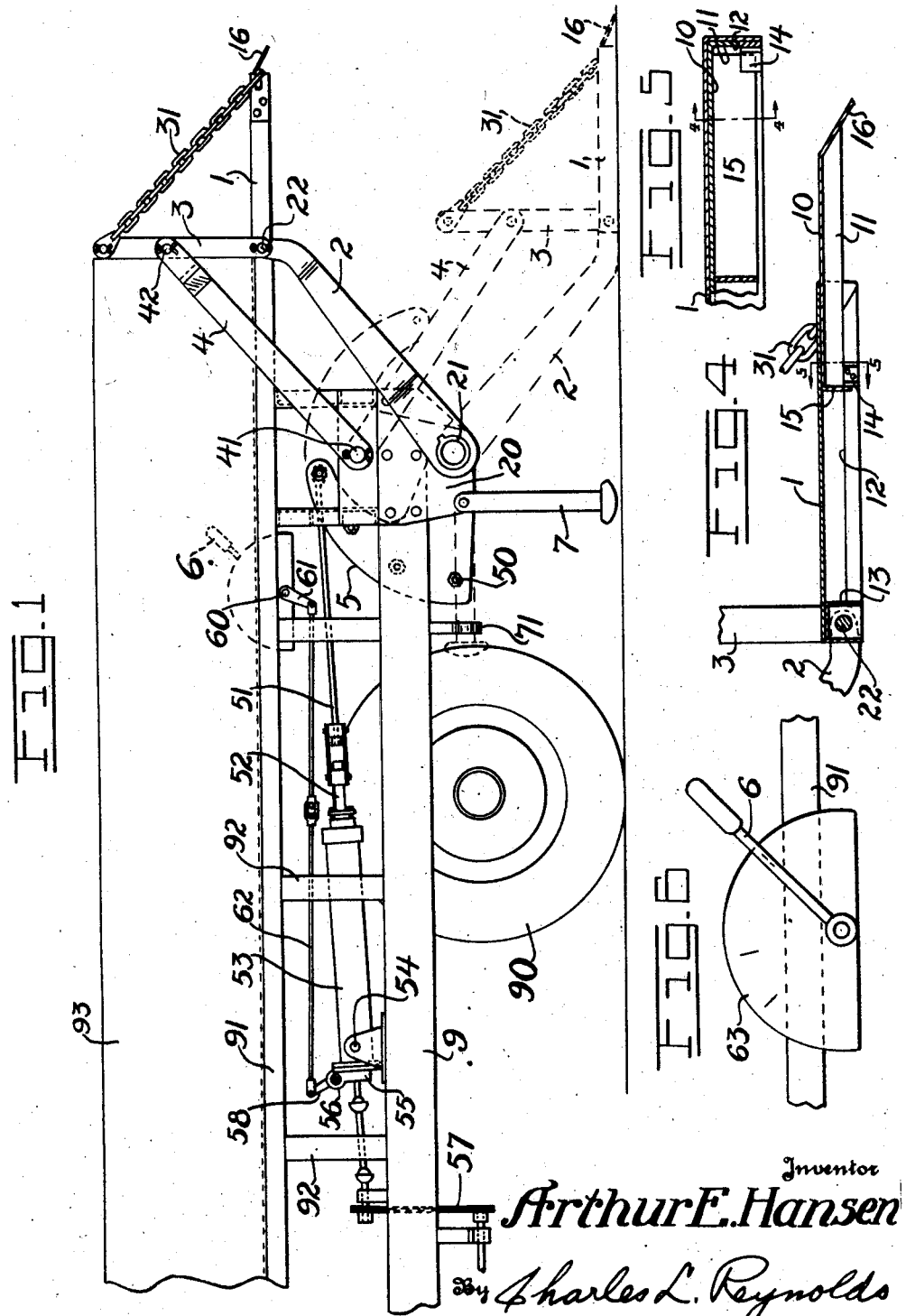
Inventor
Arthur E. Hansen
By Charles L. Reynolds
Attorney Oct. 3, 1933.     A. E. HANSEN     1,929,112
ELEVATOR FOR TRUCKS
Filed Nov. 24, 1931     3 Sheets-Sheet 2
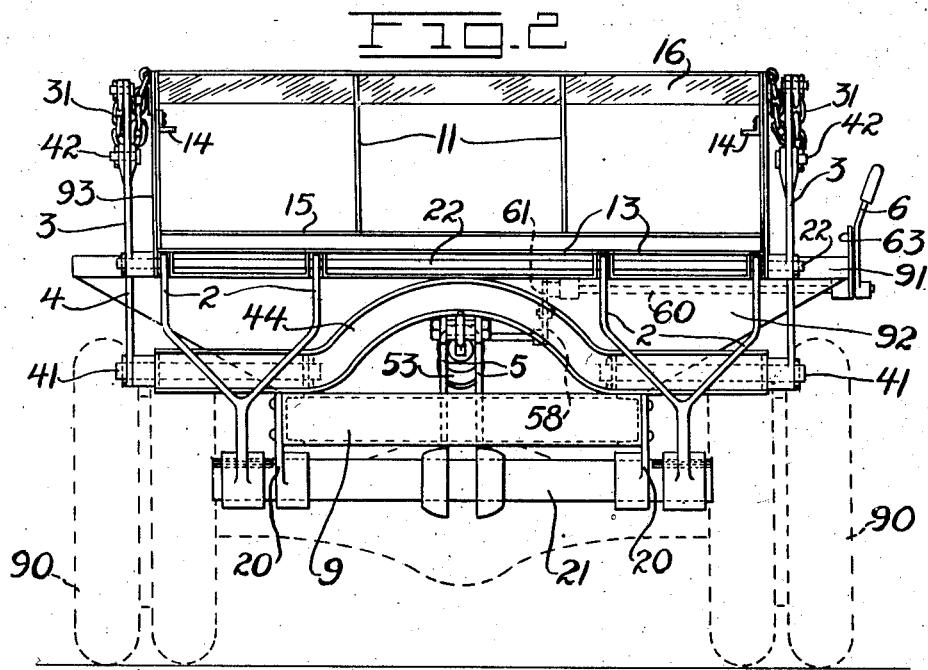
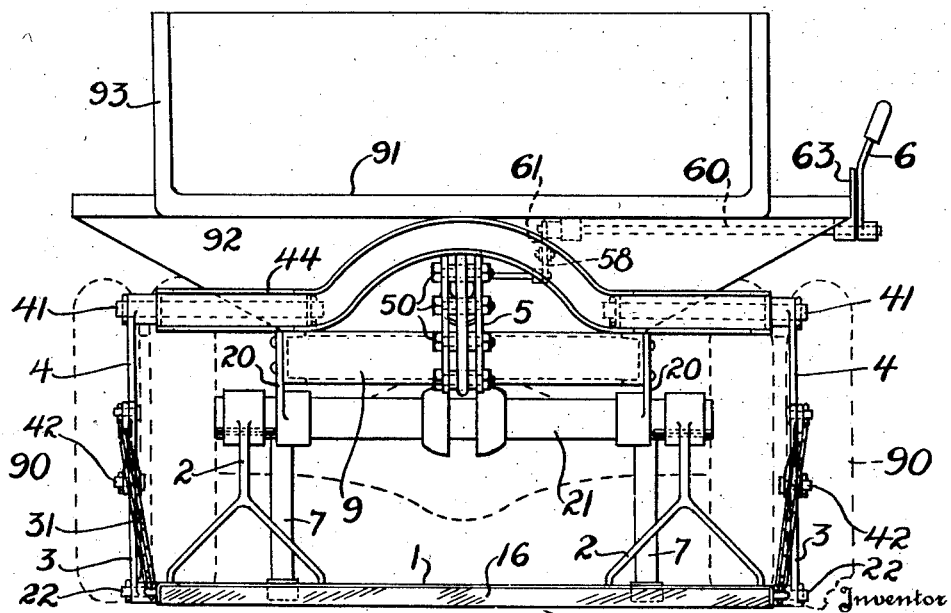

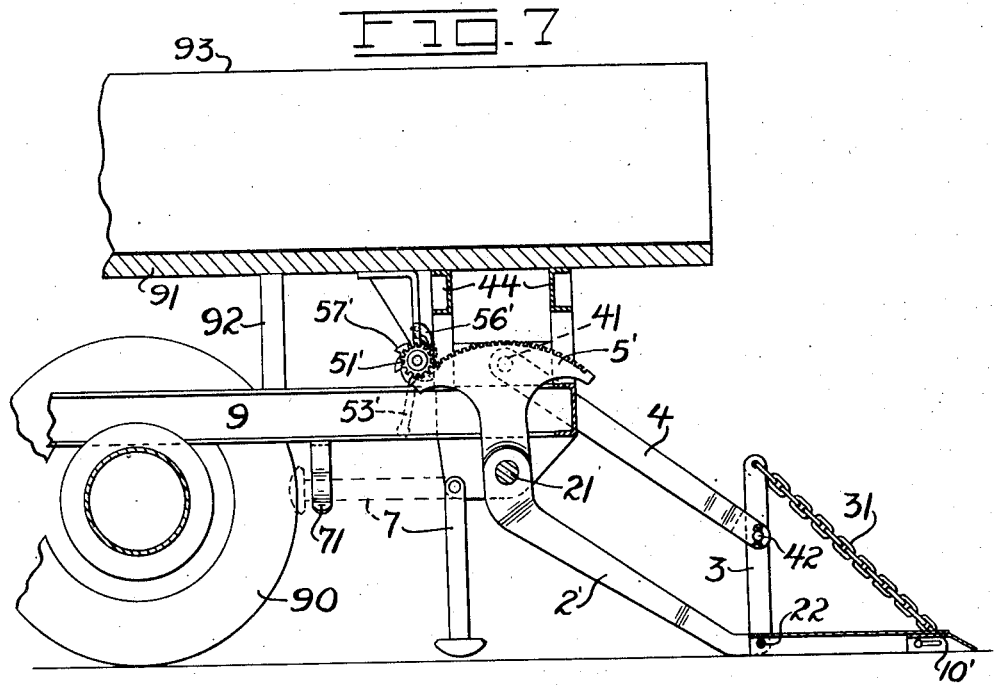
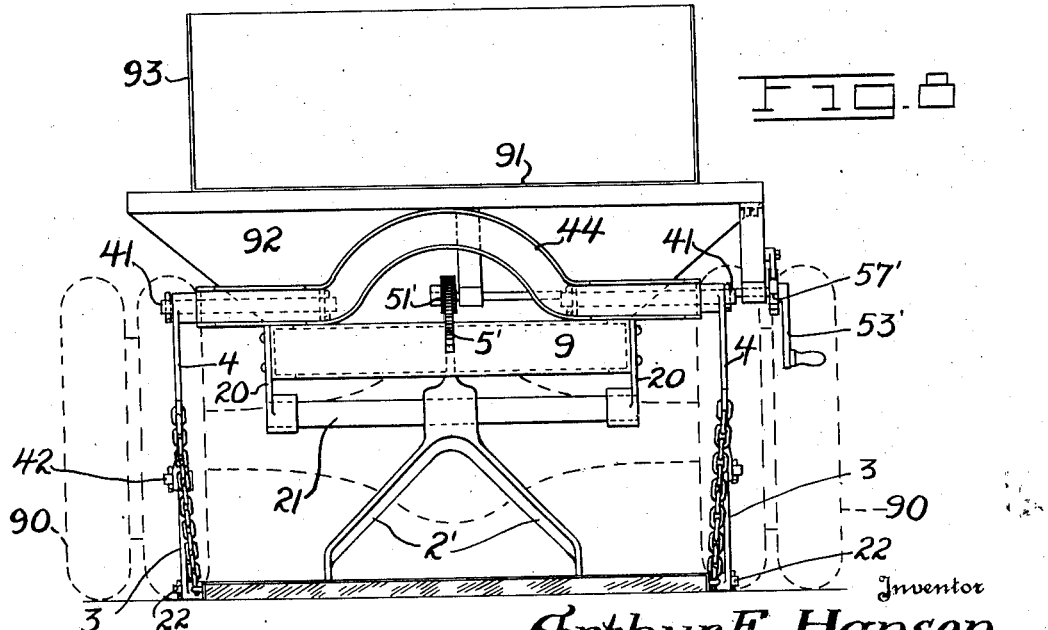

Patented Oct. 3, 1933

1,929,112

UNITED STATES PATENT OFFICE

1,929,112

ELEVATOR FOR TRUCKS

Arthur E. Hansen, Seattle, Wash., assignor to Young Iron Works, Seattle, Wash., a corporation of Washington Application November 24, 1931
Serial No. 577,042

12 Claims. (Cl. 214—77)

My invention relates in general to trucks, and more particularly to a device for elevating heavy packages from a level below the bed of the truck,—that is, the bottom of the truck body—to that level.

With present-day trucks, largely equipped with pneumatic tires in order that they may travel at good speed, it becomes necessary to place the body of the truck well above the ground. It is difficult for workmen to raise heavy packages—for instance, large barrels of flour, bales of cotton, or shipping cases—upon such trucks, and considerable time and effort is required in accomplishing that end. Workmen object to using such trucks, with the result that other equipment is used if available, with consequent loss of efficiency, time, and investment.

It is an object of my invention to provide a device, preferably built into the truck or supported upon its chassis or beneath the body, by means of which such loads may be lifted, preferably by power means, from any lower level— for instance, the ground level—to a level with the bottom of the truck body, so that the boxes need only be rolled or trucked upon the elevating platform, to be elevated in place upon the platform to a level with the truck body, and then rolled or hand trucked into position on the truck body. By such means a single workman may load a large number of heavy packages in a short space of time. As a result of a test, a single workman loaded sixteen barrels of oil, each weighing 675 pounds, in twenty minutes, a total considerably in excess of five tons.

It is a further object of my invention to accomplish the result indicated by means of simple apparatus, preferably one which is adapted to the employment of a hydraulic power or hoist unit, whereby the same may be easily and suitably controlled at all stages of the operation, and may automatically be stopped at the two extreme positions by means now commonly available.

It is a further object so to design the elevating mechanism that there will be no undue peak of stress during the elevating operation, no passing through a dead center, and whereby there will be no tendency for parts to sag and to drop the load.

It is a further object to devise an elevating platform for use in such a connection which is so constructed and mounted that it may also be employed as an end gate for the truck body; an associated object is to devise mechanism capable of use as an elevator and as an end gate, without detracting from the ability of the truck to be used for other purposes—for instance, as a dump truck.

It is a further object to provide an elevating platform for use in such a connection, the effective area of which may be increased at will.

The above stated objects are not exclusive of others, and such other objects may be ascertained as this specification progresses, and from a study of the drawings.

My invention comprises the novel parts and the novel combination and arrangement thereof, as shown in the accompanying drawings, described in the specification, and as will be more particularly pointed out by the claims which terminate the same.

In the accompanying drawings I have shown my invention embodied in forms which are now preferred by me.

Figure 1 is a side elevation of the rear end of a truck, illustrating my elevating device associated therewith.

Figure 2 is a rear view of the truck and elevating device, showing the elevator platform upraised in the position of an end gate.

Figure 3 is a view similar to Figure 2, showing the elevator platform in its lowered position.

Figure 4 is a longitudinal vertical section through the elevator platform, shown with the extension platform extended, the view being substantially along the line 4—4 of Figure 5, and Figure 5 is a transverse vertical section substantially on the line 5—5 of Figure 4.

Figure 6 is a side elevation of the control handle, and the indicating means associated therewith.

Figure 7 is a longitudinal vertical section through the rear end of a truck, illustrating a slightly modified form of my invention, and Figure 8 is a rear end view of the same, corresponding substantially to Figure 3.

The invention is capable of employment in connection with various types of trucks, and I have illustrated a conventional truck chassis 9 supported upon and driven by the rear wheels 90, and carrying a body 91 supported upon cross bolsters 92. Such a body may have the sides 93, the end being preferably left open.

Supported beneath the body 91—for instance, upon brackets 20 bolted or riveted to the rear end of the chassis 9—is a lifting arm or arms 2. The number employed is largely immaterial, though in order to balance the stresses it is preferable that two be employed, one at each side. However, since the two sides are identical, a description of one side alone will suffice. Similarly, each arm may be furcated, as illustrated, to distribute the lifting stresses.

At its forward end this lifting arm is pivotally supported, being secured, for instance, upon the transverse shaft 21. The rear ends of these arms 2 are pivotally connected, for example, through the medium of the transverse pin 22, to a platform member 1. I prefer, for reasons that will appear hereafter, that the connection be not a direct one, but rather that the platform 1 be pivotally supported upon the cross rod 22, which rod is supported by the swinging end of the arm 2.

Preferably there is also pivotally supported upon the cross rod 22 an upright bar 3. The platform 1, distant from the pivot 22, may be braced and supported from the upper end of the upright bar 3 in any suitable manner, for instance, by the limit chain 31.

In order to maintain this bar 3 upright, and to guide the bar 3 and the platform 1 for movement through positions always parallel to any given initial position, I employ an arm 4 which is pivoted at 41 immediately above the shaft 21 and at 42 upon the bar 3. The spacing between the axes at 21 and 41 is substantially the same as the spacing between the axes 22 and 42, whereby the arms 2 and 4 constitute in effect a pair of parallel links. The pivot at 41 may be upon a transverse member 44 which is supported from the chassis 9.

The pivot 22 may occupy a position substantially at the end of the truck body, so that the platform 1 may swing as an ordinary tail gate. The chain 31 limits its downward swinging to a horizontal position, and permits it to swing upward into a substantially vertical position, where it will be suitably secured in a manner common in connection with tail gates. Provision may be made, if desired, for letting go the chain 31 altogether, so that the end gate may swing completely down.

The manner of swinging the lifting arm 2 and its parallel link, the arm 4, is largely immaterial. However, it makes for simplification to employ a circular segmental member 5 which may be made up of two plates spaced by suitable spreaders and bolts, illustrated at 50, whereby there is formed a substantially circular segmental groove to receive a flexible member such as the chain or cable 51. The member 5 is secured upon the shaft 21, and will be shaped to avoid contact with parts of the chassis and like members. The cable 51 is connected to the piston rod 52 of a hydraulic power unit, generally indicated at 53. This is mounted upon the chassis or beneath the body, for instance, by the pivotal mounting at 54 (see Figure 1), and there is normally incorporated in such a unit a pump 55 controlled by a valve 56. Suitable power means to drive the pump 55, from the truck's motor, are indicated generally at 57.

In order to control the position of the valve 56, and thereby the direction of movement of the piston rod 42, the valve lever 58 may be connected to a suitable control lever 6 carried upon the shaft 60, upon which shaft is secured a lever 61 connected by a link 62 to the valve lever 58. Movement of the control lever 6 over a quadrant 63 (see Figure 6) gives corresponding movement to the valve lever 58, and the quadrant may be marked as is indicated at Figure 6 with suitable indications to designate positions in which the pump will cause movement of the power mechanism in a direction to elevate the platform 1, to lower it, or to hold it immovable in any given position. This control handle may be located in a convenient position on the truck body, for instance, adjacent its rear end, where the operator can watch the load as it is being elevated.

In order to avoid overtaxing the springs and to relieve any detrimental strain on the chassis during the operation of the elevator, when heavy loads are concentrated at its rear end, it may be desirable to employ a leg 7 which may be pivotally supported from the chassis to swing down into a position where it will nearly or quite contact with the ground, thereby to support a portion of the load, and which may be swung upward and held, for instance, in clips 71, when the truck is travelling.

It may be desirable to load large bulky packages which require more area than is available in the height of the average end gate, and the platform 1 therefore may have associated with it an extension platform 10, which is slidably mounted to be extended laterally. Downwardly turned flanges on the extension platform 10 may rest upon ledges 12 at the sides of the elevating platform 1. A stiffening member 13 forms an inward stop for the extension platform 10, and brackets 14, engageable by a downwardly turned flange 15 upon the extension platform serve as outward limiting stops. The ribs 11, incidentally, serve to stiffen not only the extension platform 10 but the elevating platform 1. Either the elevating platform 1, if the extension platform is not used, or the latter, may be provided with an inclined apron 16 facilitating the wheeling of hand trucks or dollies thereupon.

Figures 7 and 8 illustrate a modified form, one adapted for light work and for hand operation. The circular segmental member 5' herein takes the form of a gear, and meshing therewith is a gear pinion 51' operable by a crank handle 53'. A dog 56' engageable with a ratchet wheel 57' serves to hold the elevating mechanism at any desired point. Any suitable brake mechanism (not shown) may be used to retard downward movement of the platform.

In this form the circular segmental member 5' is formed integral with the lifting arm 2', and the construction is thereby simplified. The extension platform 10' is rudimentary only, since it will not ordinarily be desirable to carry large and bulky loads on light equipment such as is illustrated in connection with this form.

It is believed that the operation of the device is obvious. The platform 1 may be dropped to any desired position, for instance, to the ground level, and while in this position may have placed upon it the load which is to be elevated to the truck body 91. Now the power mechanism is brought into play, causing the lifting arm 2 to rise, and it will be observed that it rises substantially from a point where the rod 22 is 38° below the shaft 21 to a point where it is 38° above it. Such angles, it will be understood, are illustrative only. The parallel link 4 maintains the bar 3 upright and the platform 1, braced therefrom, horizontal, and because the pivots of these parallel links are disposed one above the other, the four pivots never come into alignment, and consequently there is no position where the load passes dead center, nor increases considerably with respect to other positions. When the load has reached the level of the truck body, the platform 1 abuts the rear end of the truck, and the load may be pushed, rolled, or wheeled off the platform and onto the truck body.

If at any time the operator desires to hold the platform 1 at a position it has attained, whether the lowered position, the upper position, or any intermediate position, he may accomplish this by suitably positioning the control handle 6, as has been explained. By suitable arrangement of the power hook-up and the automatic stop or by-pass usually incorporated in hoist pumps, the platform will be made to stop automatically in the two extreme positions.

When the load is finally in place, the platform 1 being in its upper position, may be moved to its upraised position, where it stands vertically, and being secured in this position it acts as a tail gate to prevent loss of the load. Incidentally, being thus upraised, there is no possibility of the extension platform 10 being extended, and the apron 16, if provided on the extension platform, may be sufficiently withdrawn that it will not be subject to damage. If the operator wishes to drop the tail gate out of the way he lets go the chains 31, and accomplishes his end without disturbing the power mechanism.

What I claim as my invention is:

1. In combination with a truck body, an elevator platform, an upright bar to the lower end of which said platform is pivotally connected, and means extending between the bar and platform to limit the latter's downward swing to substantially a horizontal position, two parallel links of equal length each having one end pivotally mounted at points beneath the body, spaced one above the other, the other end of said links being pivotally connected with the upright bar at points spaced substantially the same as the spacing of the first points, and likewise disposed one above the other, and means to swing said parallel links to raise the bar and platform, the latter through horizontal positions, from the ground level to the level of and abutting the end of the body.

2. In combination with a truck body, an elevator platform, an upright bar to the lower end of which said platform is pivotally connected, collapsible brace means connecting the upper end of the bar and the platform outwardly of such pivot to limit the downward movement of the platform, whereby the platform may swing relative to the bar between horizontal and vertical positions, two parallel links each pivotally supported at one end at points spaced beneath the body, and each pivotally connected at its other end to said bar at spaced points, thereby to restrain the bar for movement through positions always parallel to an initial position, and means to elevate said bar.

3. In combination with a truck body, an upright bar, parallel links pivotally connected respectively to points spaced along said bar and to similarly spaced points beneath the body, an elevator platform swingably supported from said bar along an axis coinciding with the connection thereto of one of said links, means extending between the bar and platform to limit the latter's downward swing to a substantially horizontal position, and means to raise said platform from a lowered position to the body level.

4. In combination with a truck body, two equal parallel links pivoted each by one end therebeneath at points spaced one above the other and extending rearwardly, an elevator platform to which the rear ends of the parallel links are pivoted at spaced points one of which is disposed above the platform, and means to apply a force to the forward end of a link, thereby to swing said links and to raise the platform from a horizontal position, below the pivots beneath the body, through parallel positions to an upper position above such pivots, and substantially level with the body.

5. In combination with a truck body, an elevator platform, a lifting arm pivotally connected by one end to said platform, a transverse rock shaft to which the other end of said arm is secured, a circular segmental member likewise secured to said shaft, means to apply a force acting tangentially to said segmental member to rock said shaft, thereby to lift said platform, and a second arm pivotally supported by one end at a point spaced above said shaft, and pivotally connected by its other end to said platform at a point spaced above the pivot connection thereto of the first arm a distance equal to the spacing of their opposite ends.

6. In combination with a truck body and wheels supporting the same a given distance above the ground level, and overhanging the wheels, an elevator platform, two parallel links, each having one end pivotally mounted at points spaced one above the other, and beneath the body, the other end of said parallel links being connected to the elevator platform at points likewise spaced one above the other for movement of the platform, said pivots being so located, with respect to the ground level and body level, that the platform is guided for movement from a position at ground level and outwardly of the body's overhang, upwardly through horizontal positions always outward of the body's overhang, to the body level, in prolongation of the body.

7. In combination with a truck body and wheels supporting the same a given distance above the ground level, and overhanging the wheels, an elevator platform, a lifting arm pivotally supported beneath the body and at a level midway between ground level and the body level, a parallel link pivotally supported at a point spaced above the pivot of the lifting arm, the swinging ends of said arm and said link being pivotally connected to the elevator platform at points likewise spaced one above the other, and not lower than the plane of the platform itself, and means to raise the platform through a path prescribed by the lifting arm and link, from a position at ground level and outside the overhang of the body, through horizontal positions to the body level, in prolongation of the body.

8. In combination with a truck body, two equal parallel links pivoted each by one end therebeneath at points spaced one above the other and extending rearwardly, one of said links having an arm projecting forwardly of its pivot, an elevator platform, the rear ends of the parallel links being pivoted to said platform at points spaced one above another, the lower point being substantially in the plane of the platform, and means disposed beneath the truck body to apply a force to the said forwardly projecting arm to swing said links, thereby to raise the platform from a horizontal position, substantially at ground level, through parallel positions to an upper position, substantially level with the body.

9. In combination with a truck body, two equal parallel links pivoted each by one end therebeneath at points spaced one above the other and extending rearwardly, an elevator platform, means extending wholly above the level of the platform to support the same, the rear ends of said parallel links being pivoted to the platform-supporting means at points spaced one above another, and means to swing said links, thereby to raise the platform from a horizontal position, substantially at ground level, through parallel positions to an upper position substantially level with the body, the pivot points of the parallel links beneath the body being so located, with respect to the ground and body levels, that in movement between such levels the forward edge of the platform is never forward of the rear end of the body.

10. In combination with a truck body and wheels, two parallel links each having one end pivotally mounted at points beneath the body spaced one above the other, and one having an arm extending forward of such pivot, an elevator platform to which the other ends of said parallel links are pivotally connected at points likewise spaced one above the other, and neither of which is lower than the general plane of the platform, whereby the platform may rest upon the ground at the normal level whereon the wheels rest, and means disposed beneath the truck body to apply a force to said forwardly extending arm to raise the platform through a path prescribed by said parallel links.

11. In combination with a truck body, an elevator platform, a lifting arm pivotally supported by one end at a point beneath the body and substantially midway between the ground level and the body level, and pivotally connected by its other end to the platform, means to swing said arm to raise the platform to an upraised position at the body level, and a link pivoted above the lifting arm at the platform, and likewise pivotally supported above the first-mentioned pivot of the lifting arm, to maintain the platform substantially level throughout its raising.

12. In combination with a truck body, an elevator platform having associated with it a supporting member extending upward at its forward edge, a lifting arm pivotally supported beneath the truck substantially midway between the level of the body and the normal ground level, and engaged with said platform, a link pivoted beneath the truck body and above the pivot of the lifting arm, and extending parallel to the lifting arm to engage said upwardly extending supporting member, at a point which is above the point of engagement of the lifting arm, and at nearly the level of the pivot of the lifting arm when the platform is lowered to normal ground level, and means to swing said lifting arm to move the platform from a lowered position through horizontal positions to an upper position, at body level and in rearward prolongation thereof.

ARTHUR E. HANSEN.